(12) United States Patent
Bagabas et al.

(10) Patent No.: US 8,252,256 B2
(45) Date of Patent: Aug. 28, 2012

(54) SYNTHESIS OF ZINC-OXIDE NANOPARTICLES AND THEIR USE FOR PHOTO CATALYTIC DEGRADATION OF CYANIDE

(75) Inventors: Abdulaziz A Bagabas, Riyadh (SA); Reda M. Mohamed, Cairo (EG); Mohamed F. A. Aboud, Cairo (EG); Mohamed Mokhtar M. Mostafa, Cairo (EG); Ahmad S. Alshammari, Riyadh (SA); Zeid A. Al-Othman, Riyadh (SA)

(73) Assignee: King Abdulaziz City for Science and Technology (KACST), Riyadh (SA)

( * ) Notice: Subject to any disclaimer, the term of this patent is extended or adjusted under 35 U.S.C. 154(b) by 0 days.

(21) Appl. No.: 13/342,104

(22) Filed: Jan. 1, 2012

(65) Prior Publication Data

US 2012/0097522 A1    Apr. 26, 2012

(51) Int. Cl.
*C01G 9/00*    (2006.01)
(52) U.S. Cl. .......... 423/101; 423/102; 423/622; 516/88; 210/748
(58) Field of Classification Search .................. 423/101, 423/102, 622; 516/88; 210/748
See application file for complete search history.

(56) References Cited

OTHER PUBLICATIONS

Boening et al., A Critical Review: General Toxicity and Environmental Fate of Three Aqueous Cyanide Ions and Associated Ligands, Water, Air, and Soil Pollution 109: 67-79, 1999.

Gurol et al., Kinetics and Mechanism of Ozonarlion of Free Cyanide Species in Water, Environ. Sci. Technol., vol. 19, No. 9, 804-809,1985.

Pak et al., Oxidation of Aqueous Cyanide Solution Using Hydrogen Peroxide in the Presence of Heterogeneous Catalyst, Environmental Technology, vol. 18 pp. 557-561, (1997).

Sharma et al, Ferrate(VI) Oxidation of Aqueous Cyanide, Environ. Sci. Technol. 1998, 32, 2608-2613.

Zagury et al., Characterization and availability of cyanide in solid mine tailings from gold extraction plants, Science of the Total Environment 320 (2004) 211-224.

*Primary Examiner* — Steven Bos
(74) *Attorney, Agent, or Firm* — Geeta Kadambi Riddhi IP LLC

(57) ABSTRACT

A simple, room-temperature method of producing zinc oxide nanoparticles was established by reacting zinc nitrate hexahydrate and cyclohexylamine (CHA) in either aqueous or EtOHic medium. Particles of polyhedra morphology were obtained for zinc oxide, prepared in EtOH ($ZnO_E$), while an irregular spherical morphology, mixed with some chunky particles forzinc oxide prepared in water ($ZnO_W$). The results indicate that there are significant morphological differences between $ZnO_E$ and $ZnO_W$. $ZnO_E$ showed a regular polyhedral shape, while spherical and chunky particles were observed for $ZnO_W$. The morphology was crucial in enhancing the cyanide ion photocatalytic degradation efficiency of $ZnO_E$ by a factor of 1.5 in comparison to the efficiency of $ZnO_W$ at equivalent loading of 0.02 ZnO nanoparticles wt %. Increasing the loading wt % of $ZnO_E$ from 0.01 to 0.07 led to an increase in the photocatalytic degradation efficiency from 67% to 90% after 45 minutes and a doubling of the first-order rate constant (k).

10 Claims, 12 Drawing Sheets

SYNTHESIS OF ZINC-OXIDE NANOPARTICLES AND THEIR USE FOR PHOTO CATALYTIC DEGRADATION OF CYANIDE

FIELD OF TECHNOLOGY

This disclosure generally relates to synthesis of zinc oxide nanoparticles in either water or ethanol (EtOH) at room temperature (RT); and using the said nanoparticles for photo-catalytic degradation of cyanide present as toxic contaminant in water or soil.

BACKGROUND

Cyanide is used or produced in several industries such as gas production, metal plating, pharmaceuticals, and mining. The extensive use of cyanide results in the generation of billions of gallons of cyanide as waste. This production has increased the risk cyanide spill to the environment at several locations, such as those at Baia Mare (Romania), Kumtor (Kyrgyzstan), Omai (Guyana), and Summitville (Colorado) [Zagury et al. 2004, Boening et al. 1999]. Thus, treatment of cynanide before disposal must be considered as a serious step.

Various treatment procedures such as adsorption, complexation, and oxidation are known for treating cyanides [Gurol et al. 1985]. The procedures other than oxidation produce highly concentrated products containing toxic cyanides. Another method for treating cyanide is alkaline chlorination. However, improper chlorination of cyanide may lead to production of toxic cyanogen chloride (NCCl). Chlorination also produces high total dissolved solids (TDS) in the treated water. However, ferrate $[FeO_4]^{2-}$, as a green chemical oxidant, can address some of the concerns of chlorination in the treatment of cyanides [Pak et al. 1997, Sharma et al. 1998].

There is a need to remove the cyanide, as pollutant and contaminant, so that existing limited water resources may be recycled. There is also a serious need to clean up the soil from cyanide. There is also a need for establishing an inexpensive and efficient method for removing cyanide from water and soil.

SUMMARY

The instant application discloses a novel method for synthesizing ZnO nanoparticle photo-catalyst. In one embodiment, the effect of the various synthesizing mediums on ZnO nanoparticle photo-catalyst's physico-chemical properties are disclosed. The instant application also discloses a process of using the ZnO nanoparticle photo-catalyst to remove cyanide from water and soil by photo-catalysis method.

In one embodiment, method of synthesizing ZnO nanoparticles at RT from zinc nitrate hexahydrate and cyclohexylamine (CHA) in either aqueous solution or ethanolic solution is described.

In one embodiment, the morphology of zinc oxide nanoparticles prepared in ethanol (EtOH) represented as $ZnO_E$ and water represented as $ZnO_W$ as influenced and modulated by the physiochemical properties of the synthesis medium are shown. In another embodiment, a suspension of a ZnO nanoparticle photo-catalyst ($ZnO_E$) was used in different weight ratios to perform the photo-catalytic degradation of cyanide present in aqueous solution.

In another embodiment, characterization of several properties of the novel $ZnO_E$ and $ZnO_W$ nanoparticles were performed. This characterization was performed to prove the purity and efficacy of the prepared ZnO nanoparticles as well as to demonstrate the current methods efficiency and effectiveness.

In one embodiment, kinetics for cyanide photo-catalytic degradation was investigated with respect to $ZnO_E$ weight loading percentage.

In one embodiment, a well-controlled synthesis process at room temperature (RT) of ZnO nanoparticle photo-catalyst for economical use in catalytic applications such as water treatment and other environmental cleanup applications are disclosed. In another embodiment, a direct, simple, room-temperature synthesis method for ZnO nanoparticle photo-catalyst using CHA, as a precipitating agent, and zinc nitrate hexahydrate, as a source of zinc, in either aqueous or ethanol media are disclosed.

The novel method of synthesizing $ZnO_E$ and $ZnO_W$ nanoparticle photo catalyst and method of using them in the photo-catalytic degradation of cyanide in aqueous solutions, disclosed herein, may be implemented in any means for achieving various aspects. Other features will be apparent from the accompanying figures and from the detailed description that follows.

BRIEF DESCRIPTION OF THE DRAWINGS

Example embodiments are illustrated by way of example and no limitation in the tables and in the accompanying figures, like references indicate similar elements and in which.

Figure 1:
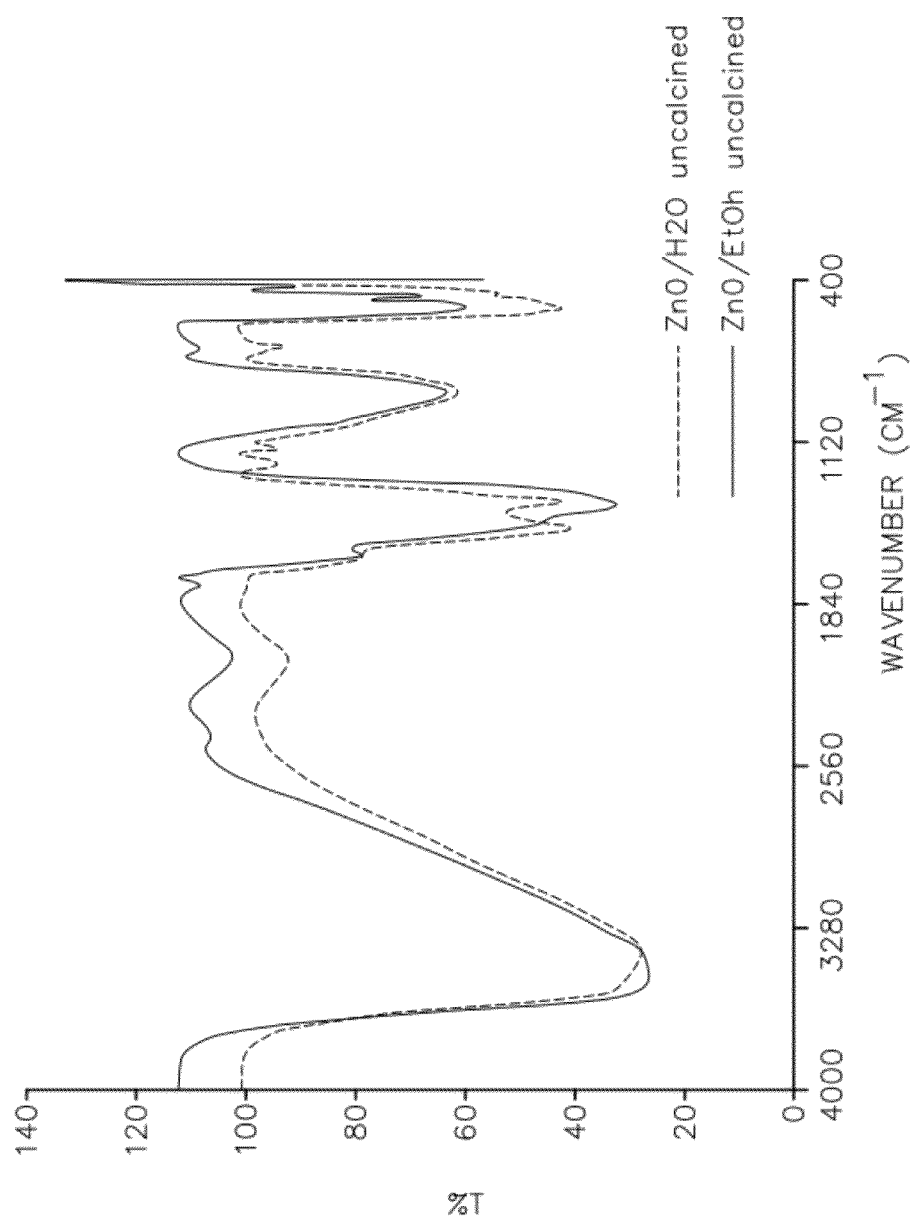
FIG. 1 shows diffuse reflectance infrared fourier transform (DRIFT) spectra of the uncalcined $ZnO_W$ and $ZnO_E$.
Figure 2:
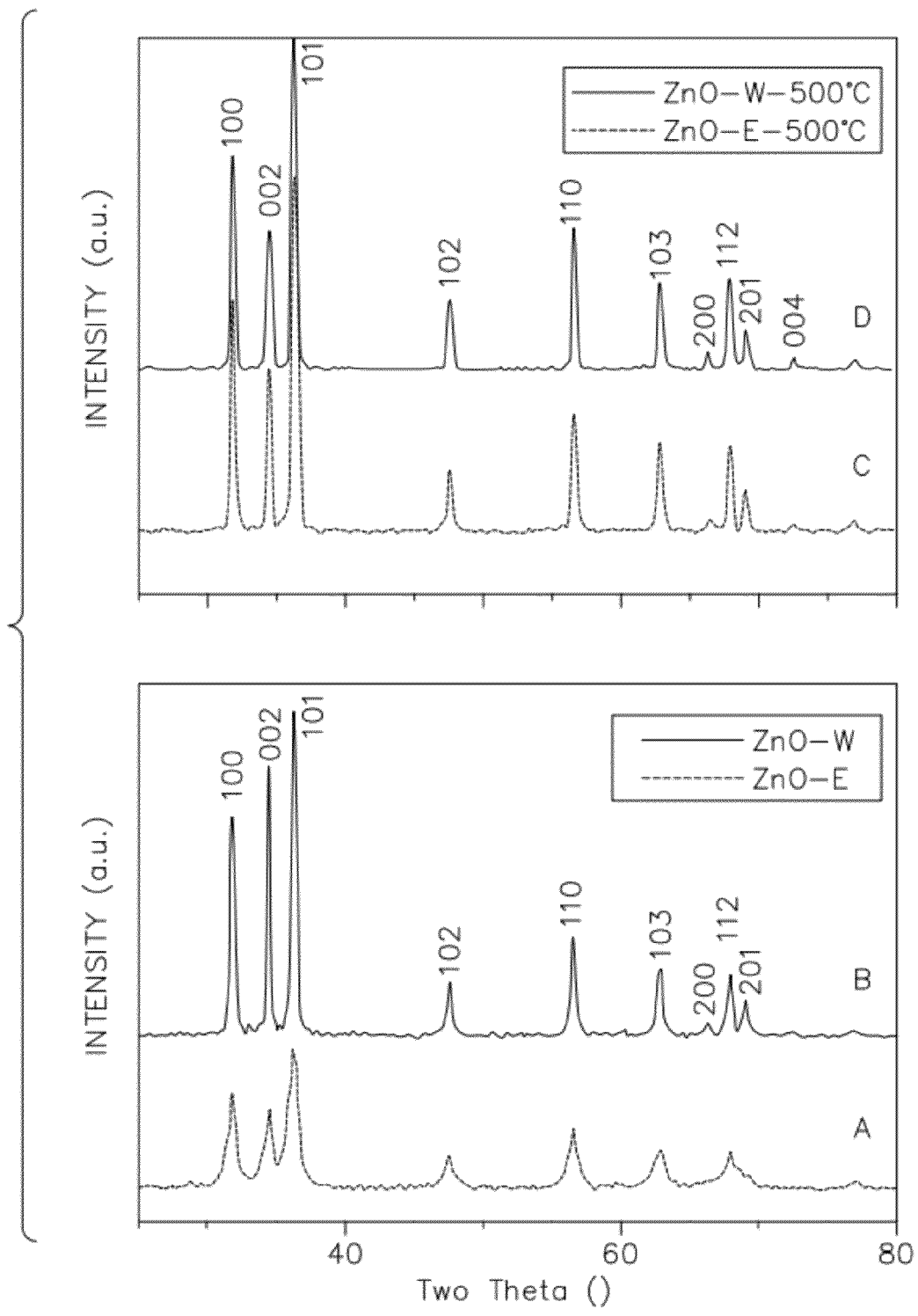
FIG. 2 shows X-ray diffraction (XRD) patterns of uncalcined $ZnO_E$ (A) and $ZnO_W$ (B). XRD patterns of calcined ZnO nanoparticles at 500° C., $ZnO_W$ (C) and $ZnO_E$ (D).

Other features of the present embodiments will be apparent from the accompanying figures, tables and from the detailed description that follows.

DETAILED DESCRIPTION

Several embodiments for novel method of synthesizing $ZnO_E$ and $ZnO_W$ nanoparticles as photo-catalyst and their application in the photo-catalytic degradation of cyanide in water and soil are disclosed. Although the present embodiments have been described with reference to specific example embodiments, it will be evident that various modifications and changes may be made to these embodiments without departing from the broader spirit and scope of the various embodiments.

Synthesis of $ZnO_E$ and $ZnO_W$ Nanoparticles

Materials—Zinc nitrate hexahydrate (pure, POCH), cyclohexylamine (GC>99%, Merck), absolute EtOH (99.9%, Scharlau), potassium cyanide ($\geq$97%, Sigma-Aldrich), potassium iodide ($\geq$99.5%, Sigma-Aldrich), and ammonia solution (28-30% $NH_3$ basis, Sigma-Aldrich) were commercially available and were used as received. Deionized water (18.2 M$\Omega$·cm) was obtained from a Milli-Q water purification system (Millipore).

Method of Synthesizing and Characterization of the $ZnO_E$ and $ZnO_W$ Nanoparticles:

Preparation of ZnO Nanoparticles in EtOH ($ZnO_E$)

A 30 mmol of zinc nitrate hexahydrate was dissolved (solution one) in 60 ml of EtOH at RT, in a beaker, under continuous magnetic stirring. In a separate beaker, 60 mmol of CHA was dissolved in 20 ml of EtOH at RT. The CHA solution was poured into the zinc solution, resulting in a white precipitate, upon magnetic stirring. An extra amount 80 ml of EtOH was added to the reaction mixture, which was left stirring for four days. The precipitate was filtered off through a F-size fritted filter, and then washed with 100 ml of EtOH. The precipitate was dried under vacuum for one day. After drying, the precipitate was mixed with 300 ml EtOH and was magnetically stirred for one day for the removal of any impurity. The precipitate was filtered off and dried to give 2.572 g (yield %=98.09) of $ZnO·\frac{1}{3}H_2O$, as proven by ICP (inductively-coupled plasma) elemental analysis [Zn (cal. 74.80%, exp. 74.16%].

Preparation of ZnO Nanoparticles in Water ($ZnO_W$)

A 30 mmol of zinc nitrate hexahydrate (solution one) was dissolved in 60 ml of water at RT under stirring. In a separate beaker, 60 mmol of CHA (solution two) was dissolved in 20 ml water at RT. The CHA solution was poured into the zinc solution, resulting in a white precipitate, upon stirring. An extra amount of 80 ml water was added to the reaction mixture, which was left stirring for four days. The precipitate was filtered through a F-size fritted filter, and then was washed with 100 ml water. The precipitate was dried under vacuum for one day. After drying, the precipitate was mixed with 300 ml water and was magnetically stirred for one day for removing impurity. The precipitate was filtered and was dried to give 2.432 g (yield %=89.68) of $ZnO·\frac{1}{2}H_2O$, as proven by ICP elemental analysis [Zn (cal. 72.34%, exp. 72.88%].

Characterization of Materials and Nanoparticles:

Inductively-coupled plasma (ICP) was used to determine the content of zinc component in the unclacined ZnO, obtained at RT.

XRD patterns were recorded for phase analysis and crystallite size measurement on a Philips X pert pro diffractometer (XRD), operated at 40 mA and 40 kV by using $CuK_\alpha$ radiation and a nickel filter, in the 2 theta range from 2 to 80' in steps of 0.02°, with a sampling time of one second per step. The crystallite size was estimated using Scherer's equation. XRD patterns were recorded for the uncalcined and calcined (500° C.) ZnO materials.

XPS spectra for the uncalcined ZnO powder samples were recorded on Jeol JPS 9010MC spectrometer by using $MgK_\alpha$ X-ray radiation (hv=1253.6 eV), operated at 20 mA and 10 kV. The base pressure in the analysis chamber was kept around $2.6\times10^{-7}$ Pa. Energy scales were referred to the line of Al 2p at 73.9 eV.

DRIFT spectra of ground, the uncalcined ZnO powder samples, diluted with IR-grade potassium bromide (KBr), were recorded on a Perkin Elmer FTIR system spectrum GX in the range of 400-4000 $cm^{-1}$ at room temperature.

Solid-state ultraviolet-visible (UV-Vis) absorption spectra for the calcined ZnO powder samples were recorded on a Perkin Elmer Lambda 950 UV/Vis/NIR spectrophotometer, equipped with 150 mm snap-in integrating sphere for capturing diffuse and specular reflectance.

The morphology was investigated using a field-emission scanning electron microscope (FE-SEM model. FEI-200NNL), equipped with EDXspectrometer for elemental analysis, and a high-resolution transmission electron microscope (HRTEM model: JEM-2100F JEOL). EDX spectrometry was used to analyze the surface chemical composition of the ZnO samples. Carbon-coated copper grids were used for mounting the samples for HRTEM analysis.

The photo-catalytic evaluation was carried out using a horizontal cylinder annular batch reactor. A black light-blue florescent bulb (F18W-BLB) was positioned at the axis of the reactor to supply UV illumination. The reaction suspension was irradiated by UV light of 365 nm at power of 18 W. The experiments were performed by suspending 0.01, 0.02, 0.03, 0.05, or 0.07 wt. % of calcined ZnO into a 300-ml, 100 ppm potassium cyanide (KCN) solution, with its pH adjusted to 8.5 by ammonia solution. The reaction was carried out isothermally at 25° C. and samples of the reaction mixture were taken at different intervals over a total reaction time of six hours. The $CN^-_{(aq)}$ concentration in the samples was estimated by volumetric titration with $AgNO_3$, using potassium iodide to determine the titration end-point. The removal efficiency of $CN^-_{(aq)}$ has been measured by applying the following equation; % Removal efficiency $=(C_o-C)/C_o\times100$ where $C_o$ is the initial concentration of $CN^-_{(aq)}$ and C is the concentration of uncomplexed $CN^-_{(aq)}$ in solution.

Results and Discussion

Formation of zinc oxide from the combination of zinc nitrate hexahydrate and CHA either in aqueous or ethanolic medium can be illustrated by equation (1):

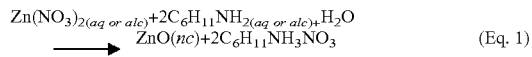

(Eq. 1)

CHA, according to equation 1, acts as a base in the Brønsted-Lowry sense, but not as a base in the Lewis sense (a ligand). This behavior of CHA was proven by the isolation and determination of the structure of cyclohexylammonium nitrate crystals by single-crystal X-ray diffraction. This observed Brønsted-Lowry basicity of CHA can be attributed to its moderate base strength ($pK_b$=3.36) when hydrolyzing in water according to equation 2:

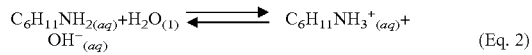

(Eq. 2)

Due to the high basicity of the CHA solution (pH=12.5), zinc ions react with the hydroxide ions and form different hydroxyl complexes such as $[ZnOH]^+$, $[Zn(OH)_2]_{(aq)}$, $[Zn(OH)_3]^-_{(aq)}$, and $[Zn(OH)_4]^{2-}_{(aq)}$. Furthermore, the high basicity makes the chemical potential of hydroxide ion $[OH^-]$ high, leading to a shift in the equilibrium in equation 3 towards the formation of oxide ion ($O^{2-}$):

(Eq. 3)

The formation of zinc hydroxide complexes and oxide ions shifts the equilibrium in equation 2 forward, causing further protonation of CHA and the formation of more hydroxide ions.

The formation of oxide ion according to equation 3 is responsible for the construction of Zn—O—Zn bonds by transforming the zinc hydroxide complexes into solid-phase according to equation 4:

$$2[Zn(OH)_n]^{2-n}_{(aq)} \rightleftarrows [Zn_2O(OH)_{2n-2}]^{4-2n}_{(aq)} + H_2O_{(l)} \quad \text{(Eq. 4)}$$

Equation 4 shows that the construction of ZnO crystal takes place via the interaction between the surface hydroxide of the growing crystals and the hydroxide ligands of the zinc complexes. Therefore, the formation of ZnO, according to the above proposed mechanism, is due to the high basicity of the reaction medium, which causes an increase in the concentration of the precursors (zinc hydroxide complexes) and an increase in the chemical potential of hydroxide ions.

FIG. 1 shows the DRIFT spectra of the uncalcined ZnO nanoparticle photo-catalyst, prepared in either $H_2O$ or ethanolic medium. The absorption bands in the region of 600-400 $cm^{-1}$ can be attributed to the crystal or lattice and coordinated water as well as ZnO nanoparticle photo-catalyst. In addition, the asymmetric and symmetric stretching H—O—H vibration bands are observed between 3600 and 3200 $cm^{-1}$, while the bending H—O—H vibration bands are observed between 1630 and 1600 $cm^{-1}$. The water diagnosis by DRIFT is in agreement with the ICP prediction of water presence in the uncalcined $ZnO_W$ and $ZnO_E$ as shown above (see para 0029 and 0030).

FIGS. 2A, 2B, 2C, and 2D show the XRD diffraction patterns of all investigated samples. The patterns consist of broad peaks, which match the common ZnO hexagonal phase, i.e wurtzite structure. Before calcination, the sharper, higher peak intensities of $ZnO_W$ than those of $ZnO_E$ implies that the latter has a smaller crystallite size than that of the former. The average crystallite size, estimated by Scherrer's equation for the (100), (002) and (101) diffractions peaks, for $ZnO_E$ is almost half that of $ZnO_W$ (Table 1). After calcination, however, both of $ZnO_E$ and $ZnO_W$ had the same average crystallite size of 28.83 nm (Table 1). Such observation could be contributed to the difference in the number of moles of water of crystallization in each material, resulting in more shrinkage relative to the particle coarsening effect upon calcination for the $ZnO_W$.

TABLE 1

Average crystallite size of the unclacined and calcined $ZnO_E$ and $ZnO_W$ nanoparticle photo-catalyst.

|  |  |  | Miller Indices (hkl) | | | Average crystallite |
|---|---|---|---|---|---|---|
|  |  |  | 100 | 002 | 101 | size (nm) |
| Crystallite size (nm) | uncalcined | $ZnO_E$ | 13.95 | 14.47 | 18.24 | 15.55 |
|  |  | $ZnO_W$ | 33.49 | 28.96 | 39.25 | 33.90 |
|  | calcined | $ZnO_E$ | 33.45 | 24.83 | 28.22 | 28.83 |
|  |  | $ZnO_W$ | 33.45 | 24.83 | 28.22 | 28.83 |

Figure 3:
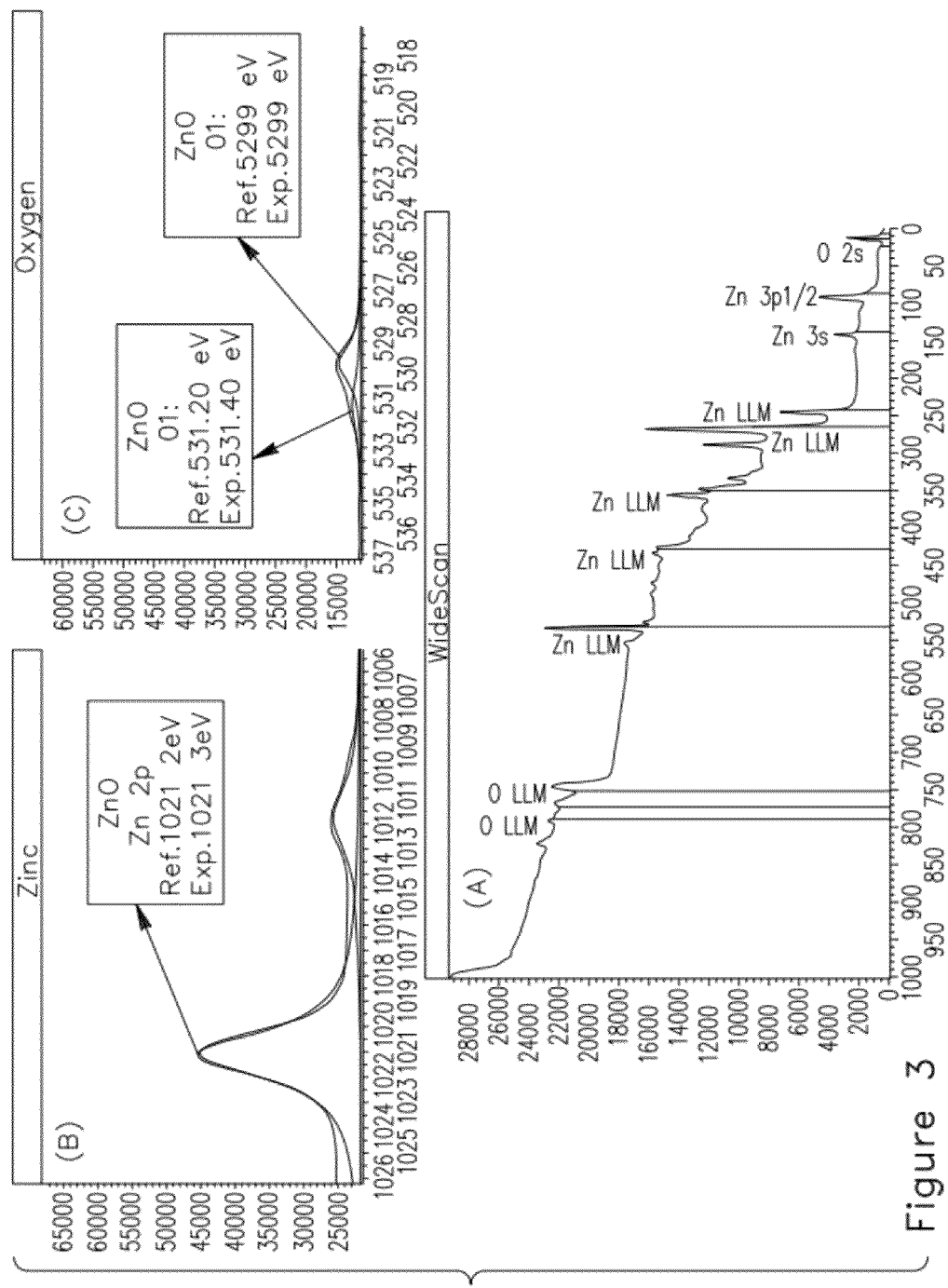
FIG. 3 shows the survey spectra of X-ray photoelectron spectroscopy (XPS) (A), Zn $2p_{3/2}$ XP spectra (B) and O 1s XP spectra (C) for the uncalcined $ZnO_E$.
Figure 4:
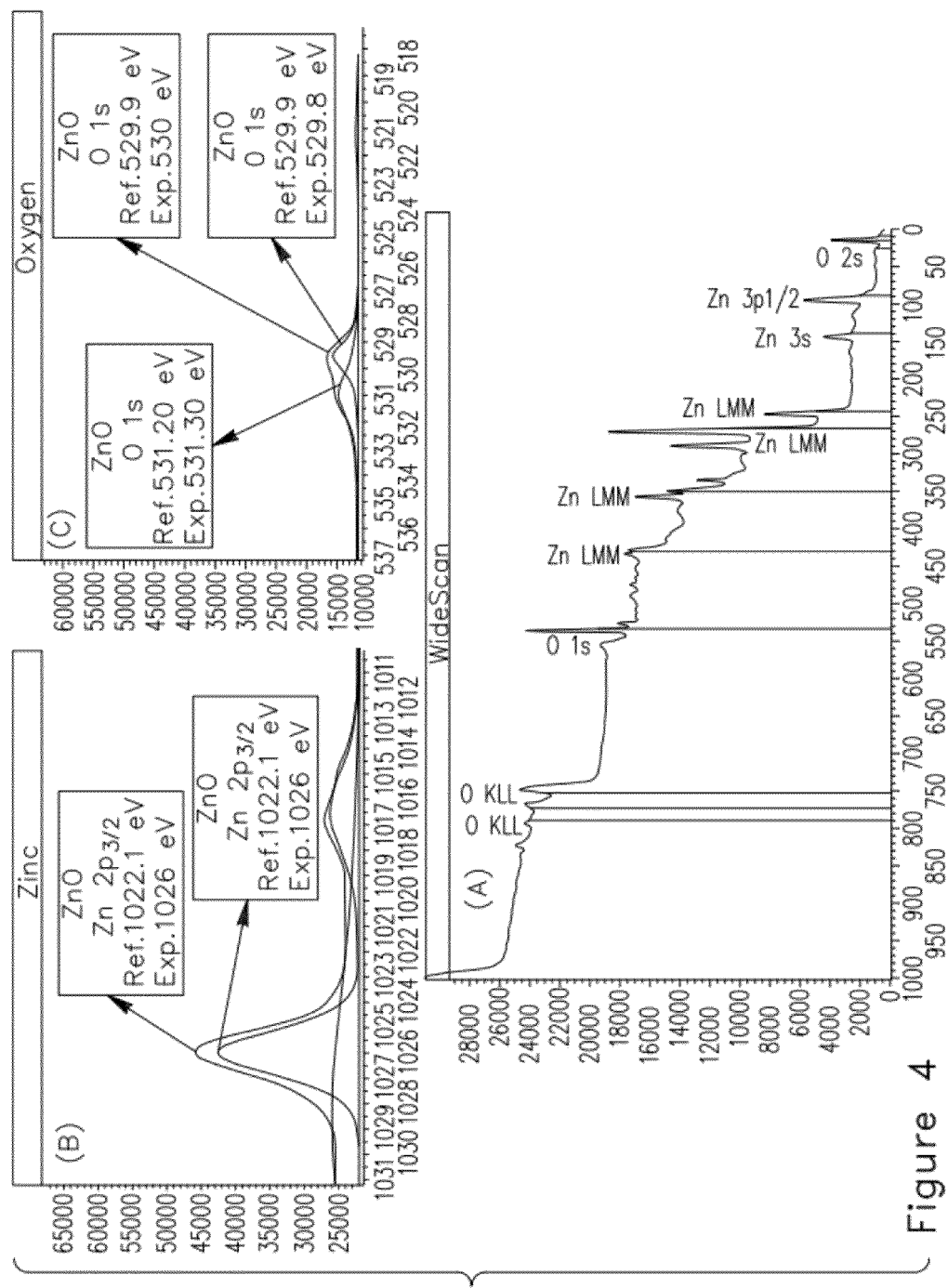
FIG. 4 shows the survey spectra of XPS (A), Zn $2p_{3/2}$ XP spectra (B) and O 1s XP spectra (C), for the uncalcined $ZnO_W$.

FIG. 3 shows a typical wide scan spectrum for the uncalcined $ZnO_E$ nanoparticle photo-catalyst. The photoelectron peaks of Zn and O arise from the nanoparticles, while C 1s peak detection is attributed to the carbon paste, used to stick the sample on the mount. The chemical state of Zn in $ZnO_E$ nanoparticle photo-catalyst is analyzed in detail by investigating Zn $2p_{3/2}$, Auger Zn LMM and O 1s peaks. A noticeable shift was observed in the Auger signal spectra because of their high sensitivity to the chemical environment. The shown Zn $p_{3/2}$ photoelectron line at BE of 1021.3 eV is characterizing the ZnO state. The asymmetric O 1s peak was coherently fitted by two nearly Gaussian components, centered at 531.4 eV and 529.9 eV, characterizing the ZnO states. The same features were observed for the uncalcined $ZnO_W$, as shown in FIG. 4. The Zn $2p_{3/2}$ line at BE of 1026 eV, indicates the existence of ZnO state. The O 1s line shows two nearly Gaussian components, centered at 529.8 and 531.3 eV, indicating the presence of ZnO state.

Figure 5:
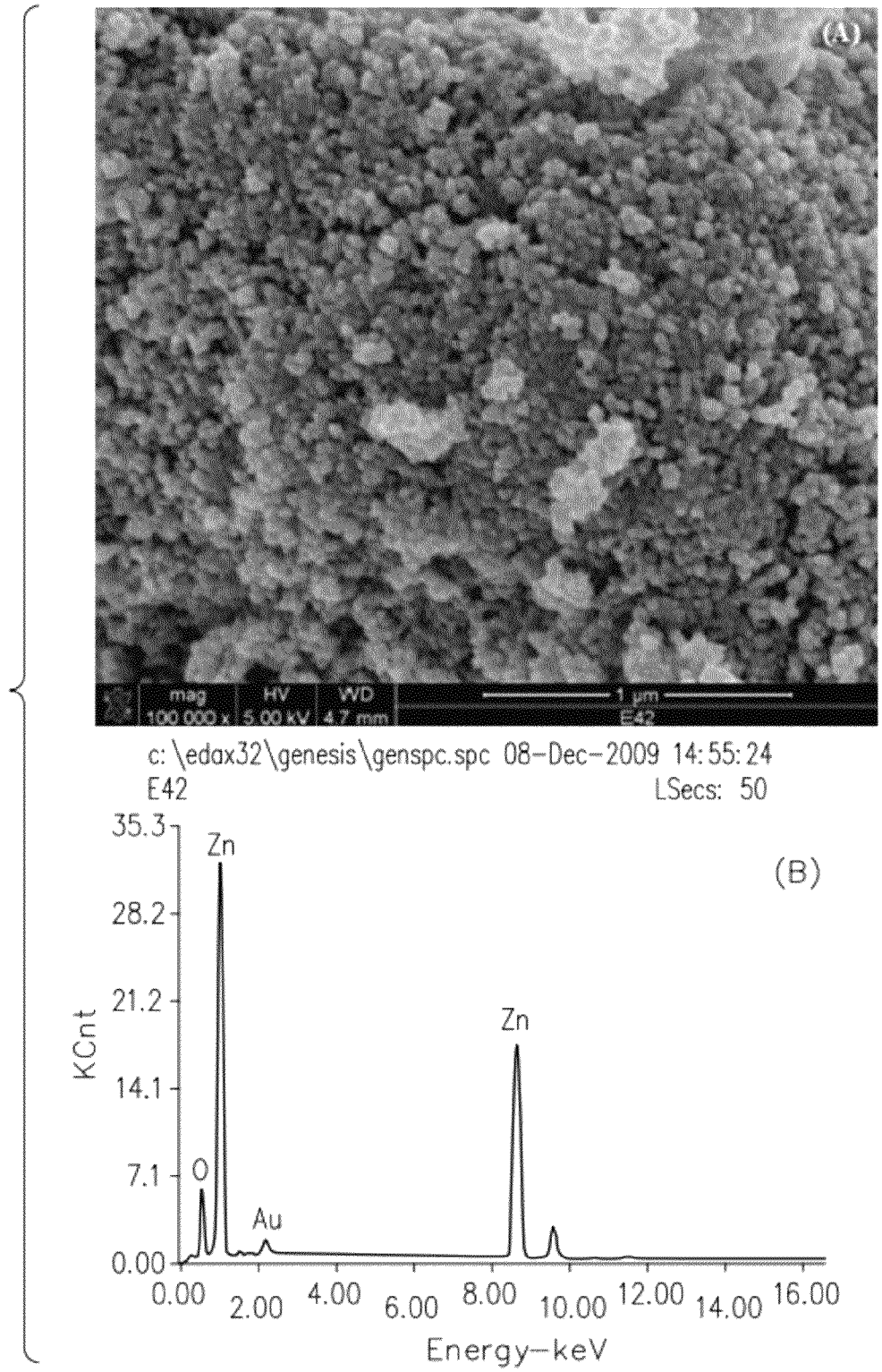
FIG. 5 shows Scanning electron micscpoicy (SEM) (A) and Energy-dispersive X-ray spectroscopy (EDX) (B) analyses for the unclacined $ZnO_E$.
Figure 6:
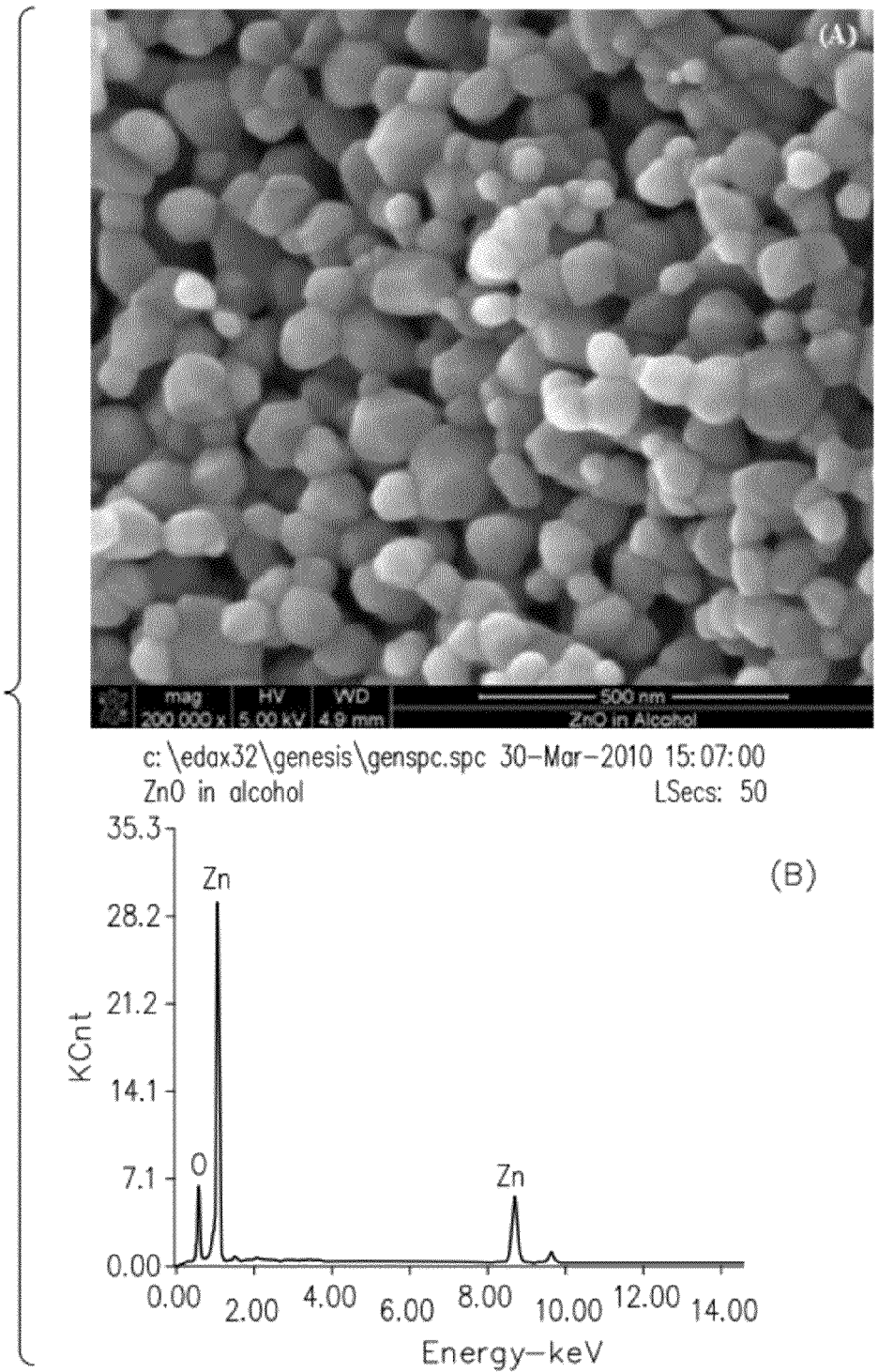
FIG. 6 shows Scanning electron microscope SEM (A) and Energy-dispersive X-ray spectroscopy (EDX (B) analyses for the calcined $ZnO_E$.
Figure 7:
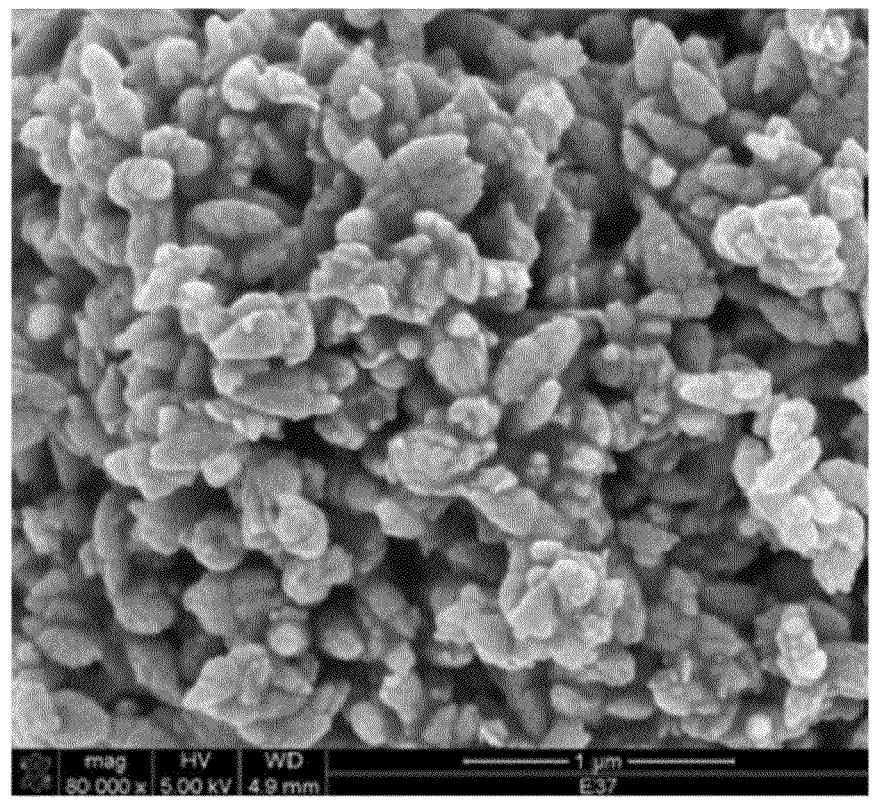
FIG. 7 shows Scanning electron microscope SEM (A) and Energy-dispersive X-ray spectroscopy EDX (B) analyses for the uncalcined $ZnO_W$.
Figure 7:
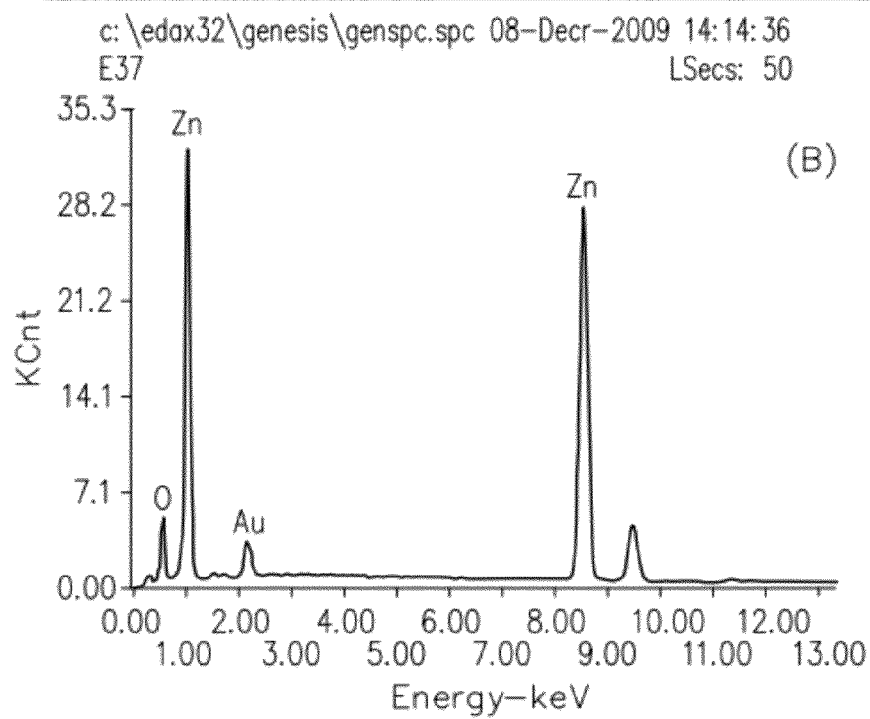
Figure 8:
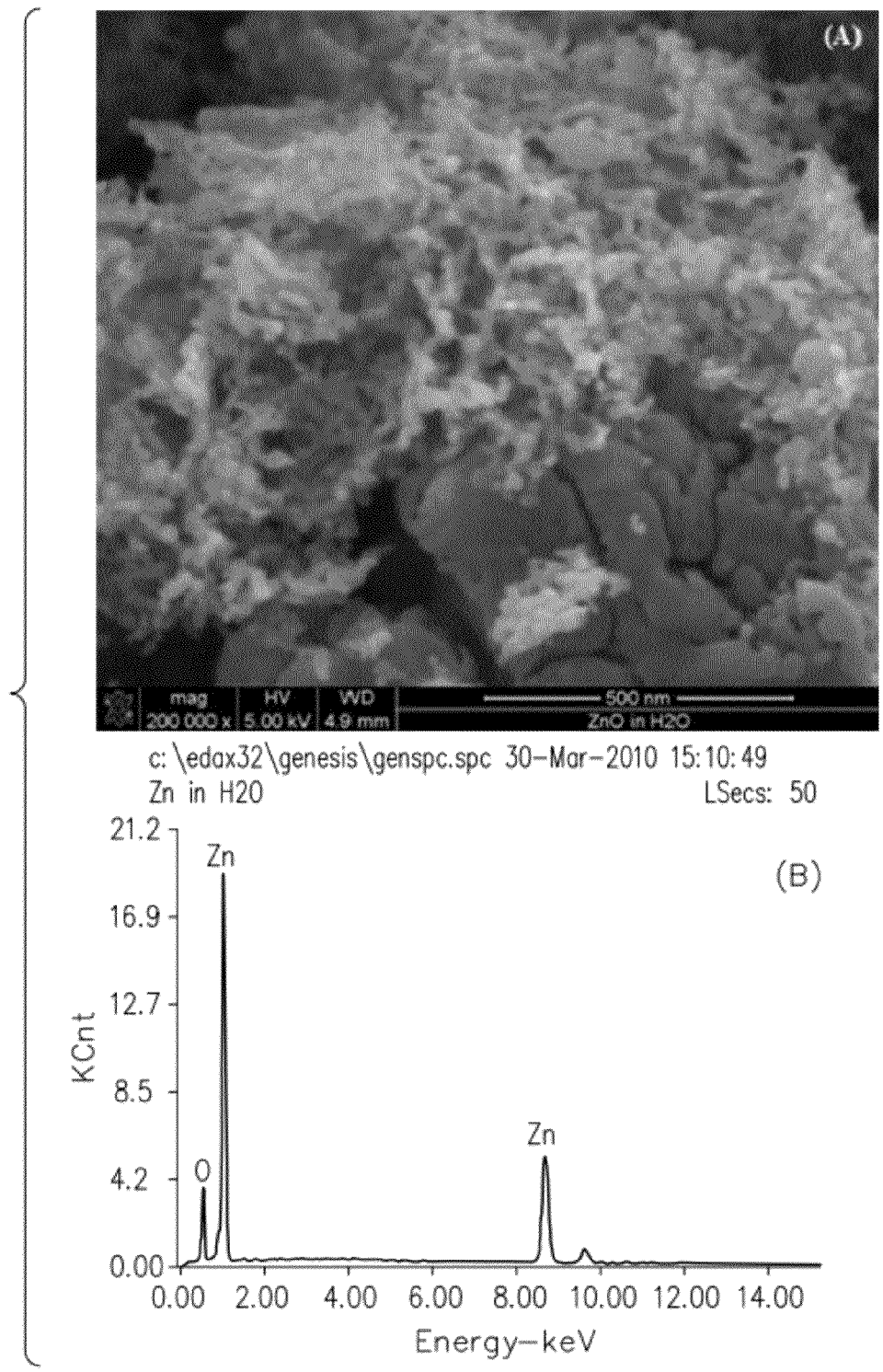
FIG. 8 shows Scanning electron microscope SEM (A) and Energy-dispersive X-ray spectroscopy EDX (B) analyses for the calcined $ZnO_W$.

FIGS. 5A and 6A show the SEM images of the uncalcined and calcined $ZnO_E$ nanoparticle photo-catalyst, respectively, while FIGS. 7A and 8A show the SEM images of the uncalcined and calcined $ZnO_W$ nanoparticle photo-catalyst, respectively. The uncalcined $ZnO_E$ nanoparticle photo-catalyst is composed of homogeneously defined nanoparticles. On the other hand, the uncalcined $ZnO_W$ nanoparticle photo-catalyst is made of irregularly-shaped, overlapped nanoparticles. Removal of lattice water upon the calcination process enhanced the nanoparticles features. Regular, polyhedral nanoparticles were observed for the calcined $ZnO_E$. Inhomogenous, spherical particles along with some chunky particles were observed for the calcined $ZnO_W$. The EDX analyses of the uncalcined and calcined nanoparticle photo-catalyst of $ZnO_W$ and $ZnO_E$ (FIGS. 5B, 6B, 7B, and 8B) indicate the purity of all the synthesized samples with no peaks other than Zn and O. The Au peak is due to the conductive coating layer of gold. The EDX results are in parallel with the XP spectra, where both analyses proved the purity of the prepared zinc oxide.

Figure 9:
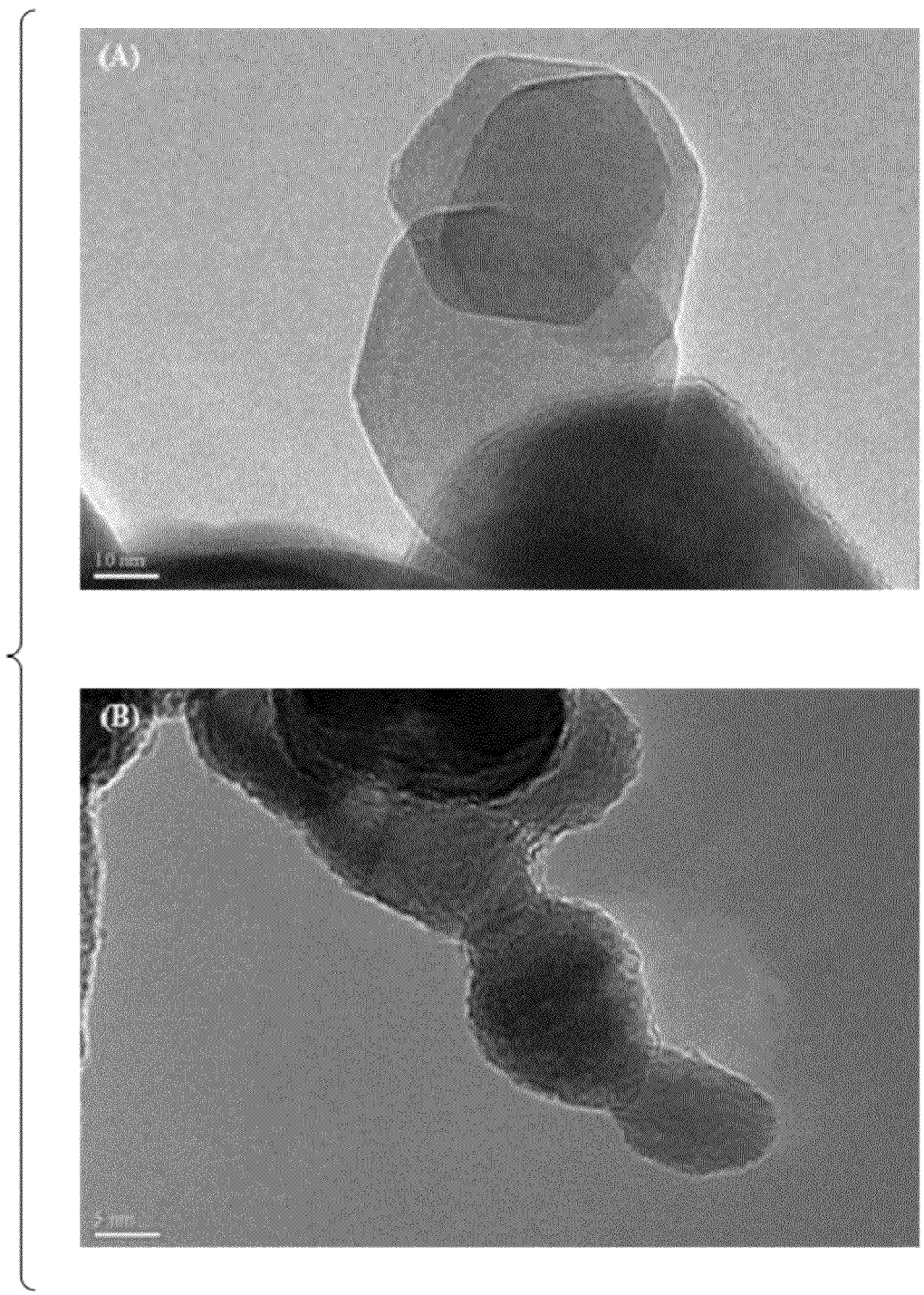
FIG. 9 shows Transmission electron microscopy (TEM) images of calcined $ZnO_E$ (×200 k) (A) and $ZnO_W$ (×300 k) (B).

TEM images (FIG. 9) of the calcined samples supported the SEM micrographs regarding the morphology of ZnO nanoparticle photo-catalyst. $ZnO_E$ nanoparticle photo-catalyst adopt hexagonal shape, with an average particle size of ~40 nm (FIG. 9A), which is consistent with the regular, polyhedral morphology observed by SEM (FIG. 6A). However, $ZnO_W$ nanoparticle photo-catalyst adopt an irregular spherical shape, with an average particle size of ~15 nm (FIG. 9B), which is consistent with the observed morphology by SEM (FIG. 8A). The more uniform polyhedral particles of $ZnO_E$ nanoparticle photo-catalyst could be attributed to the lower polarity of EtOH, compared to that of water, leading to slower ionization and deposition rate and inhomogeneous nucleation that favor the polyhedral-shaped particles.

Figure 10:
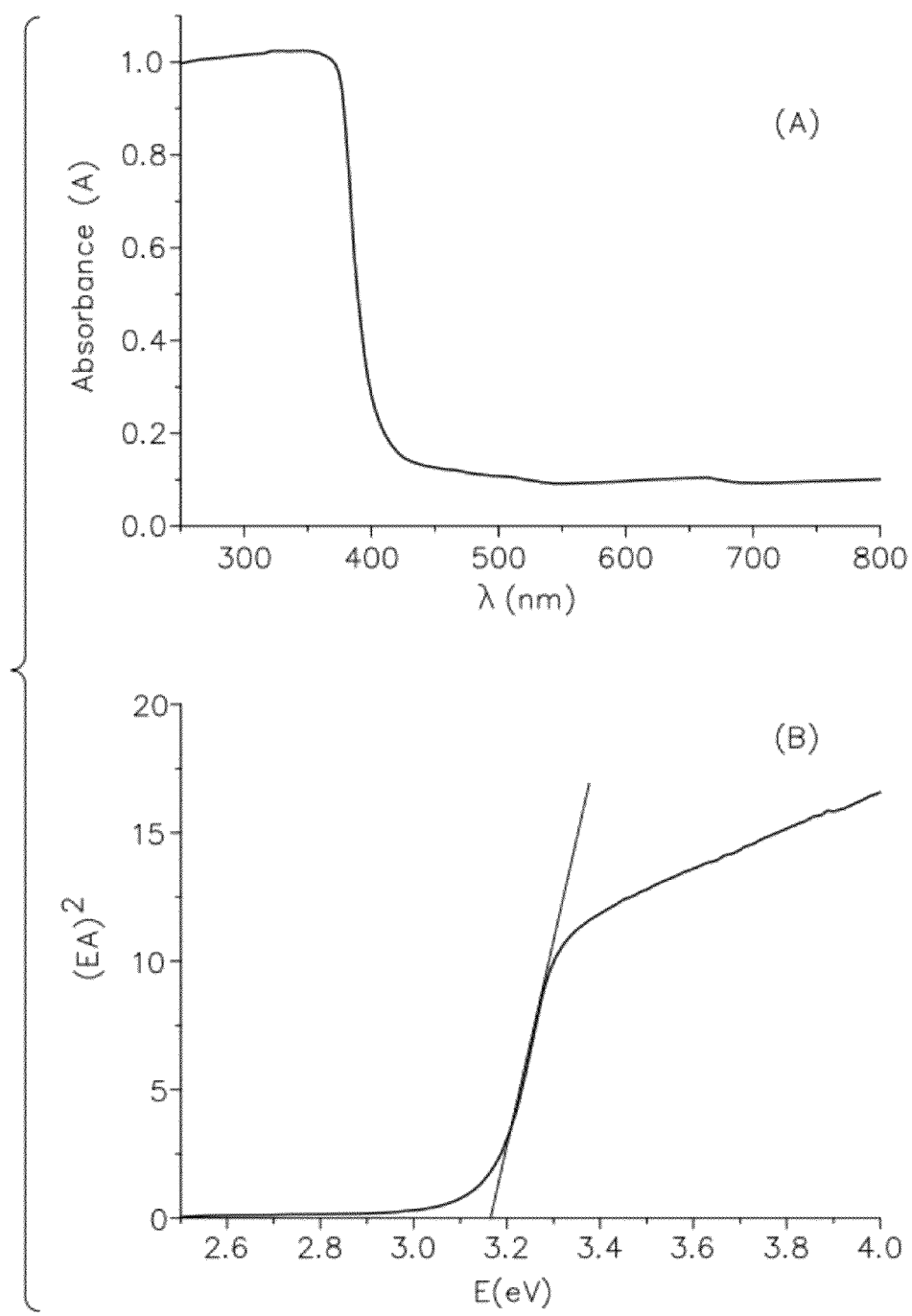
FIG. 10 shows UV-Vis absorption spectrum (A) and direct band-gap (B) for $ZnO_E$.
Figure 11:
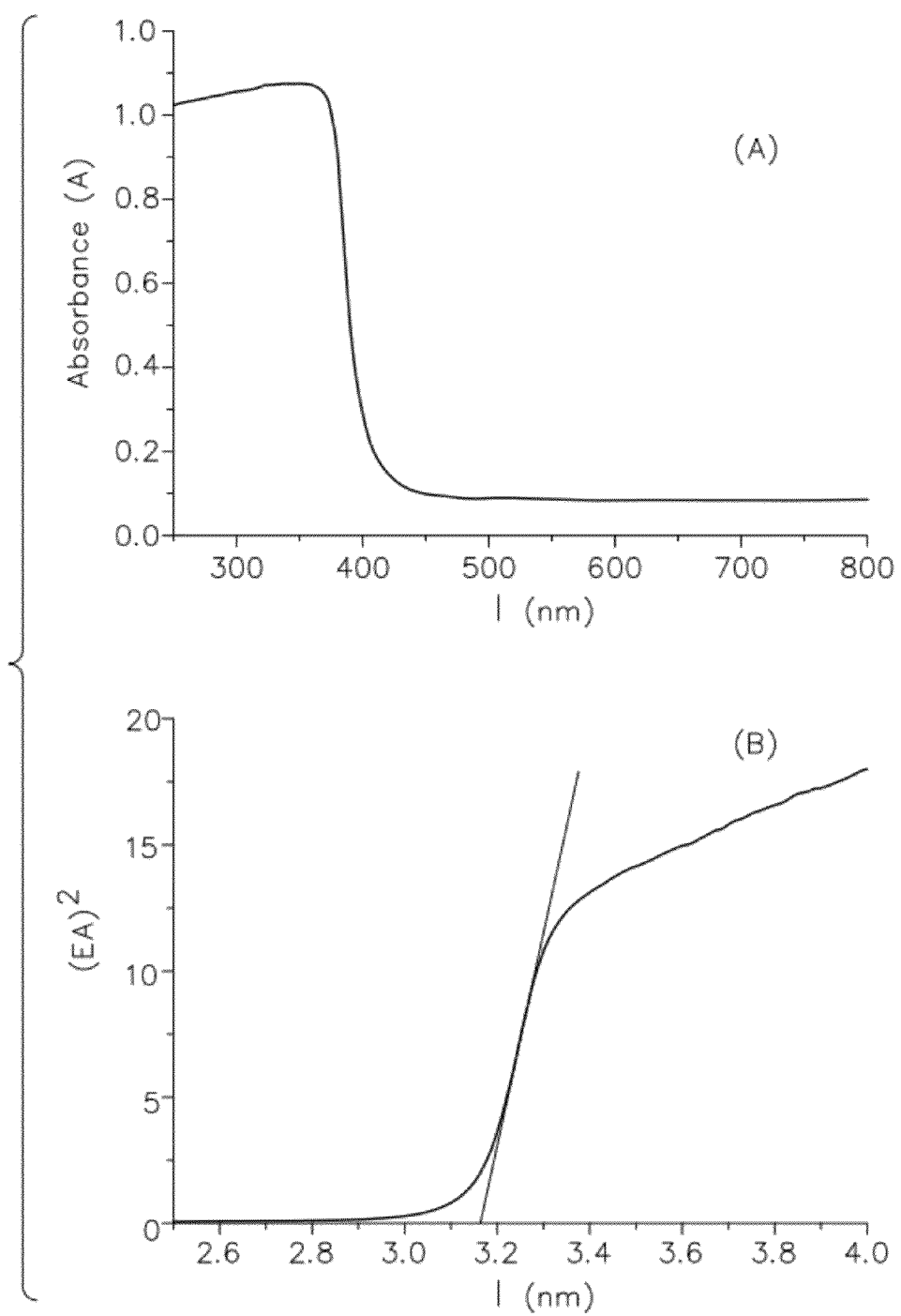
FIG. 11 shows UV-Vis absorption spectrum (A) and direct band-gap (B) for $ZnO_W$.

FIGS. 10A and 11A exhibit the UV-Vis absorption spectra for the calcined $ZnO_E$ and $ZnO_W$, respectively. The direct band-gap ($E_g$) estimations from these spectra for $ZnO_E$ and $ZnO_W$ are depicted in FIGS. 10B and 11B, respectively, where the x-axis is the photon energy (E) in eV and y-axis is the square of the product of absorbance (A) and energy $(AE)^2$. The absorption spectra and the $E_g$ (3.16 eV) for both materials are identical. Such observation implies that the optical properties of these materials are independent of their morphology (shape and size), and hence, are not affected by the synthesis medium.

Photocatalytic Degradation of Cyanide (CN)

Effect of the synthesis medium on photo-catalytic oxidation: The mechanism for the photocatalytic oxidation of cyanide by zinc oxide can be illustrated as follows:

$$ZnO + 2h\nu = ZnO(2h^+ + 2e^-)$$

$$\tfrac{1}{2}O_2 + 2e^- + H_2O = 2OH^-$$

$$2OH^- + 2h^+ = 2OH.$$

$$CN^- + 2OH. = OCN^- + H_2O$$

$$2OCN^- + O_2 = 2CO_2 + N_2$$

The overall reaction:

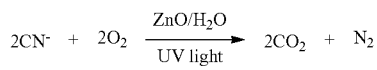

where h is Planck's constant and v is the frequency of UV light.

The effect of the synthesis medium on the photocatalytic efficiency of ZnO nanoparticle photo-catalyst was explicitly noticed by the much higher efficiency of the calcined $ZnO_E$ than that of $ZnO_W$ in the photocatalytic degradation of cyanide ion in the aqueous medium under the same conditions.

Table 2 shows that the photocatalytic activity of $ZnO_E$ is ~1.5 that of $ZnO_W$ when applying 0.0166 wt % of the ZnO photocatalyst. The higher performance of $ZnO_E$ can be attributed to the higher adsorption capability of its particles, owing to its regular, polyhedral surface faces.

TABLE 2

Effect of the synthesis medium on photocatalytic activity.

| Sample | % of cyanide degradation |
|---|---|
| $ZnO_E$ | 86 |
| $ZnO_W$ | 56 |

Photocatalytic Degradation of CN Using Different Loads of $ZnO_E$ Nanoparticle Photo-catalyst.

Photocatalytic degradation of cyanide using different weight percent of $ZnO_E$ was performed and found to depend on the ZnO wt. % loading, as shown in Table 3. It is evident that at the initial reaction stage, the catalyst concentration of ZnO has no notable effect on the catalytic performance, which might due to the high essential activity of the $ZnO_E$ catalyst. From Table 3, the smallest loading of 0.01 wt % $ZnO_E$ resulted in cyanide removal efficiency of 85% after 180 minutes, while it increased remarkably to 95% with increasing the loading from 0.01 to 0.02 wt %. However, further increase in the $ZnO_E$ loading from 0.02 to 0.07 wt % had resulted in almost 100% CN removal efficiency. This observation might be due to the increase in photon absorption by the $ZnO_E$, resulting in higher concentration of the charge carrier to degrade almost all $CN^-_{(aq)}$. The removal efficiency of CN, however, remained relatively constant with further increase in the reaction time beyond 180 minutes, indicating that the catalyst was deactivated by deposition of the reaction products on the catalyst surface. It can be stated that 0.07 wt. % of $ZnO_E$ seems to be optimum dose, which is ~0.7 less than the reported optimum dose of $TiO_2$.

TABLE 3

Influence of reaction time on photocatalytic activity at different $ZnO_E$ nanoparticle photo-catalyst loadings.

| | $ZnO_E$ loading, wt. % | | | | |
|---|---|---|---|---|---|
| Time, min. | 0.01 | 0.02 | 0.03 | 0.05 | 0.07 |
| | Cyanide removal efficiency, % | | | | |
| 3 | 10.07 | 16.77 | 24.01 | 39.02 | 41.02 |
| 5 | 24.01 | 26.55 | 27.05 | 44.04 | 47.04 |
| 10 | 37.76 | 41.45 | 51.02 | 57.02 | 63.67 |
| 15 | 52.01 | 49.11 | 70.02 | 74.5 | 79.62 |
| 20 | 57.02 | 57.02 | 78.1 | 83.15 | 87.51 |
| 30 | 58.1 | 63 | 83.2 | 83 | 86 |
| 45 | 67.04 | 65.7 | 85.05 | 86 | 90 |
| 60 | 73 | 79.8 | 90 | 91.3 | 94 |
| 90 | 78.2 | 89 | 93 | 93.4 | 96 |
| 120 | 80.1 | 90.7 | 94 | 94 | 98 |
| 150 | 83 | 91.5 | 95 | 95 | 99 |
| 180 | 84.4 | 94.8 | 95.7 | 96 | 99.74 |
| 240 | 85 | 95.3 | 95.3 | 96 | 99.74 |
| 300 | 86 | 96 | 96 | 96 | 99.74 |
| 360 | 86 | 96 | 96 | 96 | 99.74 |

Figure 12:
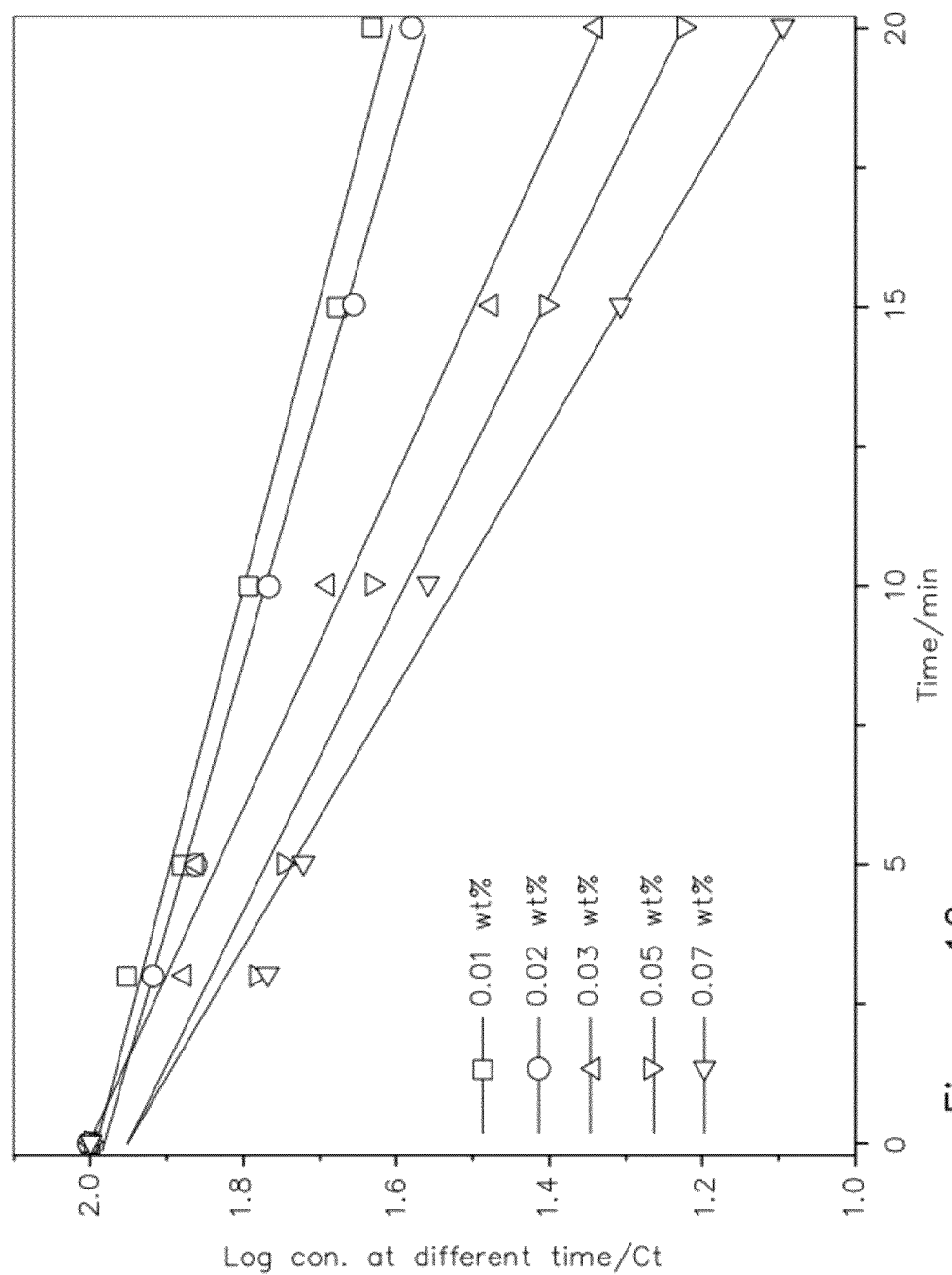
FIG. 12 shows Photo-degradation kinetic of cyanide ion over calcined $ZnO_E$.

Kinetic Photocatalytic Degradation of CN Using $ZnO_E$ Nanoparticle Photo-Catalyst The first order kinetic degradation of $CN^-_{(aq)}$ was fitted to the following expression:

$$\text{Log } [C]_t = -kt + \text{Log } [C]_o$$

where $[C]_t$ and $[C]_o$ represent the concentration in (ppm) of $CN^-_{(aq)}$ in solution at time zero and at time t of illumination, respectively, and k represents the apparent rate constant ($min^{-1}$). The kinetic analysis of cyanide photodegradation is depicted in FIG. 12, which shows that the rate of photocatalytic reaction depends on the concentration of the catalyst. An excellent correlation to the pseudo-first order reaction kinetics (R>0.99) was found. Obviously, the photodegradation rate of the CN was found to increase from 19.2 to $42.9 \times 10^{-3}$ $min^{-1}$ with increasing ZnO nanoparticle photo-catalyst loading from 0.01 to 0.07 wt. %. Such results displayed that the rate of cyanide degradation by 0.07 wt %, the optimum loading, of $ZnO_E$ proceeded 2376 times as fast as that by 0.1 wt %, the optimum loading, of $TiO_2$ at the same reaction conditions of pH, $[CN^-_{(aq)}]$, and temperature. This finding is consistent with the observed higher degradation rates when using ZnO nanoparticle photo-catalyst instead of $TiO_2$ as a photocatalyst.

TABLE 4

Apparent rate constant (k) at different loading $ZnO_E$

| $ZnO_E$ loading, Wt % | k, $min^{-1} \times 10^{-3}$ |
|---|---|
| 0.01 | 19.2 |
| 0.02 | 20.8 |
| 0.03 | 33.5 |
| 0.05 | 36.1 |
| 0.07 | 42.9 |

Zinc oxide nanoparticle photo-catalyst ($ZnO_E$) is readily prepared at RT from zinc nitrate hexahydrate and cyclohexylamine (solution two) either in aqueous or EtOH medium. The calcined $ZnO_E$ nanoparticle photo-catalyst had a regular, polyhedra morphology, while the uncalcined $ZnO_W$ nanoparticle photo-catalyst had an irregular spherical morphology, mixed with some chunky particles. The morphology was a key factor in the superior photocatalytic behavior of $ZnO_E$ nanoparticle photo-catalyst over that of $ZnO_W$ nanoparticle photo-catalyst. The differences in morphology and photocatalytic behavior are strongly influenced by the physicochemical properties of the synthesis medium.

This shows an efficient removal of cyanide from aqueous solutions. Water and soil may be treated with nanoparticles of $ZnO_E$ photo catalyst to remove cyanide as contaminant by photocatalytic degradation.

In addition, the specification and drawings are to be regarded in an illustrative rather than as in a restrictive sense.

What is claimed is:

1. A method, comprising;
dissolving zinc nitrate hexahydrate in ethanol at room temperature to make a solution one while stirring;
dissolving cyclohexylamine in ethanol at room temperature to make a solution two;
mixing and stirring the solution one and solution two with a magnetic stirrer for four days at room temperature;
to form a suspension of a zinc oxide nanoparticle; and
filtering the suspension of zinc oxide nanoparticle and collecting a precipitate of zinc oxide nanoparticle with a fritted filter.

2. The method of claim 1, further comprising;
drying the precipitate of zinc oxide nanoparticle under vacuum for one day;
mixing ethanol to the vacuum dried precipitate of zinc oxide nanoparticle to form a suspension of zinc oxide nanoparticle; and
filtering and drying the suspension of zinc oxide nanoparticle to obtain zinc oxide nanoparticle with trace amount of water; and
calcining the zinc oxide nanoparticle at 500° C. to form a zinc oxide photocatalyst ($ZnO_E$).

3. The method of claim 2, further comprising;
mixing a cyanide containing sample solution in water and the suspension of the zinc oxide nanoparticle photocatalyst to form a reaction mixture;
adjusting the pH of the reaction mixture;
irradiating the reaction mixture with a UV light of 365 nm and power of 18 W;
allowing a reaction to take place at a specific temperature; and periodically estimating a titration end point to indicate efficiency of removal of a cyanide in the reaction mixture.

4. The method of claim 3, wherein the specific temperature is 25° C.

5. The method of claim 3, wherein the pH is 8.5.

6. The method of claim 2, further comprising;
mixing solution containing cyanide and the zinc oxide photocatalyst ($ZnO_E$) having a specific concentration; and
degrading and removing the cyanide by using photocatalytic degradation for a specific time.

7. The method of claim 6, wherein the photocatalytic degradation is performed with UV light.

8. The method of claim 6, wherein the specific time is between 3 to 360 minutes.

9. The method of claim 6, wherein the specific concentration is 0.01 to 0.07 wt % of zinc oxide photocatalyst ($ZnO_E$).

10. The method of claim 6, further comprising;
removing cyanide from the solution at a rate of removal efficiency between 90-97%.

* * * * *